United States Patent

[11] 3,564,971

[72] Inventors Hans O. Wagner
  Dusseldorf;
  Gerd Traugott, Buderich, Germany
[21] Appl. No. 828,852
[22] Filed May 29, 1969
[45] Patented Feb. 23, 1971
[73] Assignee Schiess Aktiengesellschaft
  Dusseldorf, Germany
[32] Priority May 31, 1968
[33] Germany
[31] P 17 52 475.3

[54] ARRANGEMENT FOR KEEPING TRANSVERSE BEAM OF PORTAL TYPE MILLING MACHINE IN PARALLEL DISPLACEMENT WITH ITSELF
8 Claims, 6 Drawing Figs.
[52] U.S. Cl............................................. 90/16,
  90/14, 90/15
[51] Int. Cl..................................................... B23c 1/12
[50] Field of Search............................................. 90/15, 16,
  20, 11, 14; 77/4

[56] References Cited
UNITED STATES PATENTS
3,286,324 11/1966 Hautau......................... 29/27
3,460,435 8/1969 Hucks et al. .................. 90/15

Primary Examiner—Gil Weidenfeld
Attorney—Walter Becker

ABSTRACT: Portal milling machine, or the like, having a transverse beam with support carriages at the ends supported on parallel rails. Drive means are provided for driving the carriages on their respective rails and includes a common drive member and respective drive trains leading to each carriage. A measuring carriage nontiltably supported on one rail cooperates with the adjacent support carriage to develop a signal when the support carriages tilt on their rails due to lack of synchronization. The signals thus developed are employed for adjusting one of the drive trains to adjust the relative position of the support carriages thereby to eliminate the tilting thereof on the rails.

INVENTORS:
Hans O. Wagner
Gerd Traugott

INVENTORS  
Hans O. Wagner  
Gerd Traugott  
By

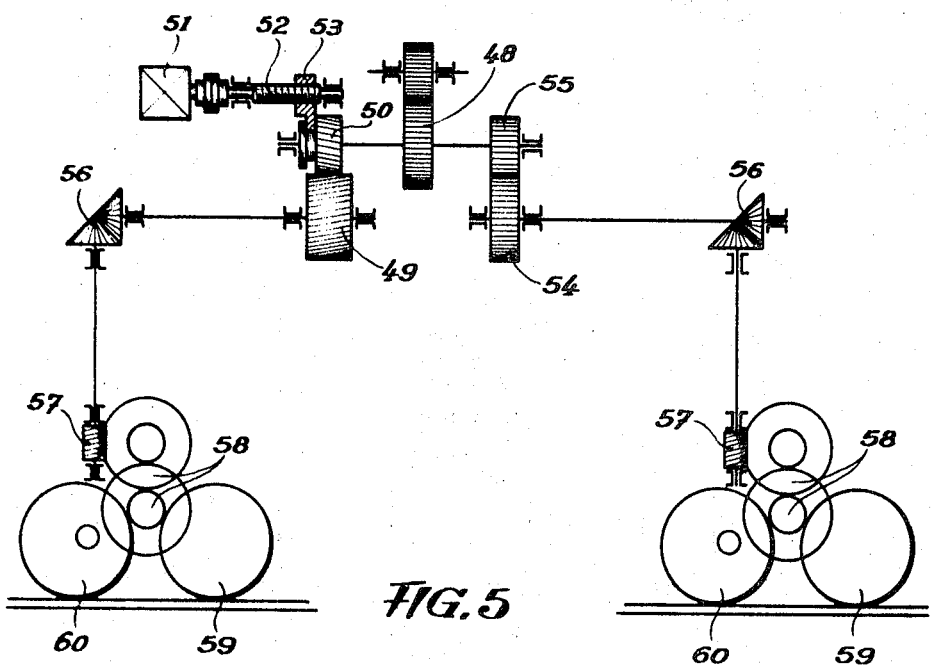
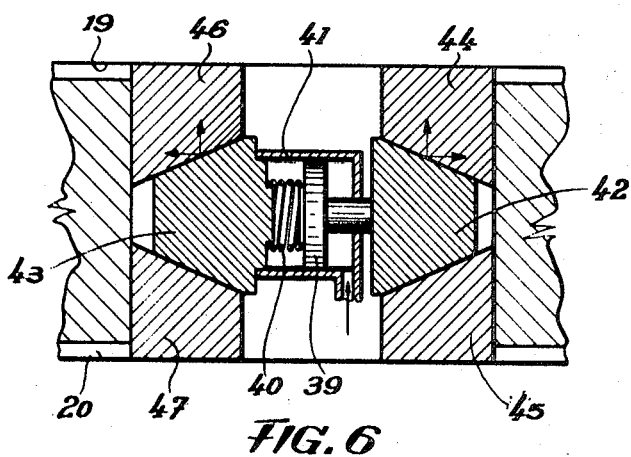

ARRANGEMENT FOR KEEPING TRANSVERSE BEAM OF PORTAL TYPE MILLING MACHINE IN PARALLEL DISPLACEMENT WITH ITSELF

The present invention relates to a portal milling machine having a transverse beam which extends over the mounting or bolster plate arranged in a pit while the ends of said transverse beam are connected to the bed carriages. The carriages are with lateral play movable on guiding beds arranged on both sides of the pit, said guiding beds being movable together by racks or spindle drives and when at a standstill are adapted to be braced and connected to the guiding beds. Machine tools of this type are used in particular for machining large workpieces in the longitudinal and transverse direction while, if desired, with one setting surfaces are to be milled precisely parallel to each other and/or at an angle to each other. Furthermore, it is necessary that these machines permit the provision of bores on the workpieces which are located in one line one behind the other or which have to be aligned while maintaining a predetermined angle.

In view of the great dimensions of the workpieces to be machined and the considerable length of the transverse beam inherent thereto, it is indispensable that the transverse beam of the portal milling machine is at both ends moved by separate drives because with only one drive jamming of the bed carriages on the guiding beds is likely. However, even with two drives which work synchronously within the range of the working tolerances, it is impossible in view of pitch and indexing errors on gears, spindles and racks to obtain a precise vertical movement of the transverse beam with regard to the guiding beds. One bed carriage will always run ahead of or lag behind the other carriage so that the error in the position of the transverse beam with regard to the vertical line relative to the direction of displacement will show up in the machining of the workpiece by means of the tool carried by the transverse beam.

It is, therefore, an object of the present invention to provide a portal milling machine of the above-mentioned general type which will overcome the above-mentioned drawbacks.

It is another object of this invention to provide a portal milling machine as set forth above, in which any deviation of the transverse beam from its predetermined guiding means in a direction perpendicular to the guiding path as a result of pitch and indexing errors of the gears or other inaccuracies in the transmission will be corrected immediately when occurring.

These and other objects and advantages of the invention will appear more clearly from the following specification in connection with the accompanying drawings, in which:

FIG. 1 diagrammatically illustrates a view of a portal milling machine according to the invention with the mounting or bolster plate arranged below the ground.

FIG. 5 diagrammatically illustrates the transmission for driving the two bed carriages of the transverse beam.

Figure 1:
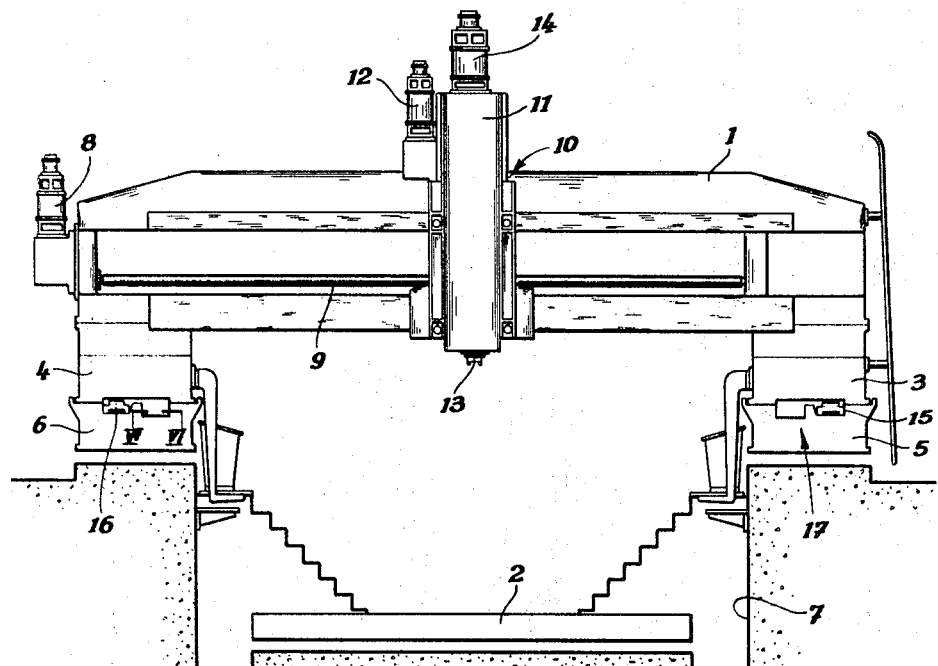

FIG. 6 illustrates on an enlarged scale a section taken along the line VI-VI of FIG. 1.

The portal milling machine according to the present invention is characterized primarily in that a measuring carriage is linked to one bed carriage, said measuring carriage being displaceable in the guiding bed by precision guiding means. The said measuring carriage has a control value emitter which is directly in contact with a contact arm connected to the bed carriage or is engaging a pivotal transmission lever, said measuring carriage being adapted to control the longitudinal displacement of the bed carriage precisely perpendicular to the bed guiding means while avoiding a displacement of the transverse beam from its position. In this way it will be assured that the transverse beam will be displaced precisely perpendicularly with regard to the precision guiding means of said one guiding bed and that each inclination of the transverse beam with regard to the direction of displacement and regardless of the causes therefor will immediately be measured when such inclination occurs and will through the control value emitter be conveyed to the transmission of said one bed carriage for purposes of changing the driving speed. The sometimes necessary speed changes of the one bed carriage relative to the second bed carriage of the transverse beam are realized by means of the transmission drive for the bed carriage. In conformity with the present invention, the transmission of the bed carriage which is displaceable together with the measuring carriages may be provided with a pair of gears having inclined teeth. One gear of this pair of gears is narrower than the other one while the narrower gear by means of a control motor controlled by the control value emitter is axially displaceable. In this way, depending on the magnitude of the displacement of the narrower gear, a momentary increase of the speed or decrease of the speed of the bed carriage connected to the measuring carriage will be obtained whereby any inaccuracies in the position of the transverse beam transverse to the precision guiding means will be corrected.

In order to permit a precise measuring of the position error of the transverse beam in its guiding path, according to a further development of the invention, the pivotal transmission lever may be rotatable about a bolt which is fixedly located in the bed carriage. One end of said stationary bolt is pivoted to the contact arm of the bed carriage, whereas the other end of said bolt extends freely with lateral play between two contacts and when being tilted engages one or the other contact whereby the control motor in one or the other direction is caused to rotate until the pivotal lever no longer engages the contact and the control motor is stopped. In this way, position errors of the transverse beam may be registered and corrected in its guiding path at a magnitude of hundredth of a millimeter.

Figure 2:
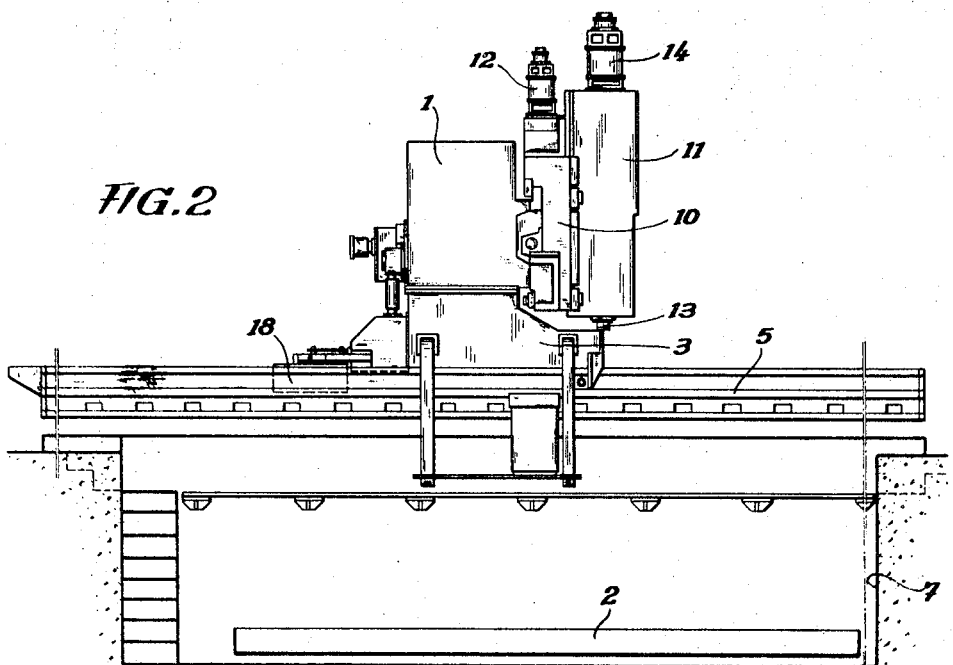
FIG. 2 is a section through the transverse beam with a guiding bed along the mounting or bolster plate.

Referring now to the drawings in detail, the portal milling machine according to FIGS. 1 and 2 comprises a transverse beam 1 which extends over the mounting plate 2 arranged at a level below the floor level. Both ends of the transverse beam 1 rest on guiding beds 5 and 6 through the intervention of bed carriages 3 and 4. As will be seen from FIG. 2, the guiding beds 5 and 6 extend along the mounting plate 2 on both sides of the pit 7. When at a standstill, for purposes of increasing the machining precision, the bed carriages 3 and 4 are adapted to be braced relative to their guiding beds by means of a device illustrated in FIG. 6 and to be described later.

The drilling and milling slide 10 is displaceable along the transverse beam 1 by means of the drive motor 8 and the spindle 9. The tool slide 11 of said slide 10 is by means of the motor 12 displaceable perpendicularly in the drilling and milling slide 10. Similarly, by means of the motor 12, the drilling and milling spindle 13 may be moved out of the tool slide 11. The motor 14 drives the drilling and milling spindle 13.

The displacement of the transverse beam 1 along the pit 7 is effected by means of precision gear racks 15 and 16 engaged by a movable pinion of the pertaining bed carriages 3, 4, said pinion not being shown in FIG. 1. The pinion drive is effected by the drive shown in FIG. 5. In this way, if a longitudinal displacement of the transverse beam 1 is desired, it may at both ends be displaced along the pit 7 and uniformly on the guiding beds 5 and 6.

It has been found that also when maintaining the finest finishing tolerances during the production of the gears and the guiding paths on the building beds and bed carriages, a running ahead or lagging behind of one of the two ends of the transverse beam, for instance, as a result of pitch and indexing errors in the gears, in the advancing transmission or in the precision racks cannot be avoided. Consequently, the transverse beam 1 will when being displaced in longitudinal direction tilt from its position precisely perpendicular with regard to the guiding path of the bed carriages whereby, for instance, a milling of parallel paths or a cutting of bores precisely one behind the other or at a right angle offset with regard to each other will no longer be possible.

In order to assure a precisely uniform displacement of the ends of the transverse beam 1, only the bed carriage 3 is laterally guided by the precision guiding means 17, whereas the bed carriage 4 is only vertically supported on the guiding bed 6. The uniform displacing movement of the two ends of the transverse beam 1 is to be brought about solely through the drive of the two precision racks 15 and 16 and not by lateral guiding paths because this might cause a canting or tilting or even a destruction of the guiding path. For controlling the advancing speeds of the bed carriages, the bed carriage 3 has linked thereto a measuring carriage 18 shown in particular in FIGS. 2 and 3 and in a modification in FIG. 4, said measuring carriage 18 likewise being displaceable in the precision guiding means 17.

Figure 3:
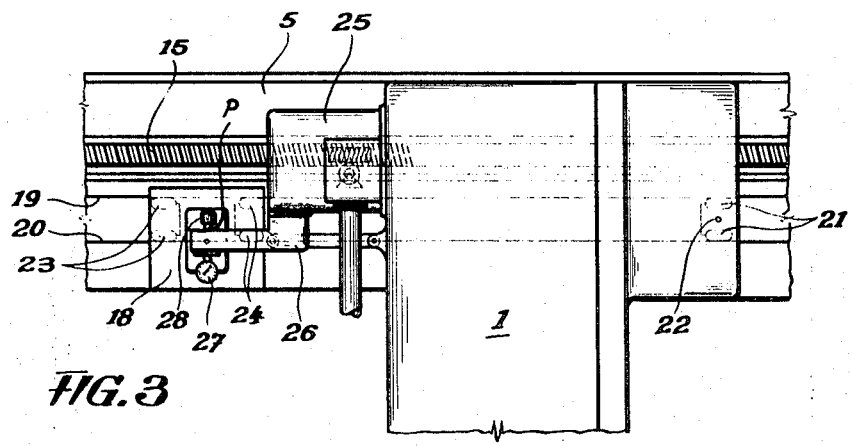
FIG. 3 represents a top view on an enlarged scale of one end of the transverse beam with a measuring carriage displaceable on the guiding bed.

The lateral guiding of the bed carriage 3 and of the measuring carriage 18 in the precision guiding means 17 is obtained by means of pairs of roller guiding elements which are connected to the bed carriage 3 and the measuring carriage 18. One of said roller guiding elements is by spring force brought into engagement with the guiding paths 19 and 20 of the precision guiding means 17. As shown in FIG. 3, the bed carriage 3 is merely by a pair of roller guiding elements 21 laterally guided so as to be tiltable to a certain extent about the axis 22, whereas the measuring carriage 18 is by means of the pairs 23 and 24 displaceable precisely parallel to the guiding paths 19 and 20.

The bed carriage 3 is provided with a support 25 having connected thereto a contact arm 26 the free end of which carries the measuring gauge 27. The feeler of the measuring gauge 27 is in continuous contact with the fixed abutment 28 which serves as control value emitter and pertains to the measuring carriage 18 so that a tilting or turning of the transverse beam 1 about the axis 22 of the pair of roller elements 21 or any displacement out of its position perpendicular to the guiding paths 19 and 20 of the precision guiding means 17 will be registered by the measuring gauge 27 and conveyed to the drive of the bed carriage 3 in order to eliminate its displacement from the position precisely perpendicular to the precision guiding means.

Figure 4:
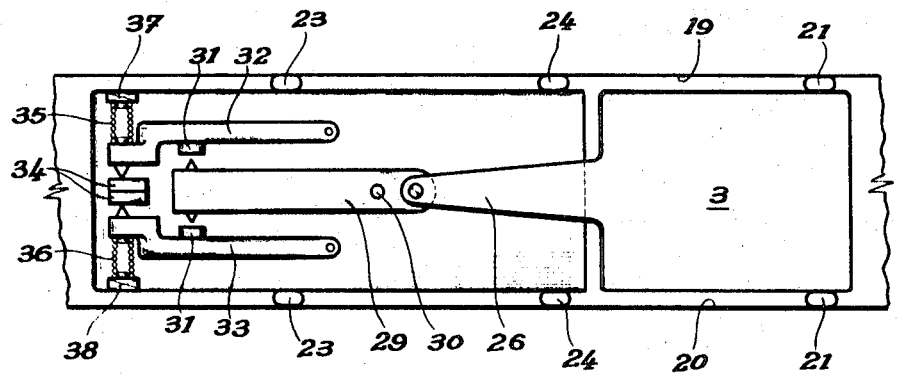
FIG. 4 shows a different arrangement of a measuring carriage.

According to the embodiment of FIG. 3, the control value emitter 28 of the bed carriage 3 is directly in contact with the contact arm 26 or the measuring gauge 27 on the contact arm 26 whereas, in conformity with the embodiment of FIG. 4, the engagement is effected through a conveying or pivoting lever 29 which is pivotable about the bolt 30 on the bed carriage 3. One end of lever 29 is linked to the contact arm 26 of the bed carriage 3 whereas the other end freely extends with lateral play between the two contacts 31. The two contacts 31 are respectively provided on the contact fingers 32 and 33. The contact fingers are respectively pivotable about an axis at their one end. The other end is spring-pressed against and through a contact on those sides of the contact fingers 32 and 33 which face each other, in engagement with an intermediate abutment 34 which is adjustable as to its thickness. The pressure spring 35 or 36 rests on one hand on the free end of the contact finger 32 or 33 and on the other hand on an abutment 37 or 38 provided on the measuring gauge 18. By means of this design of the contact fingers 32 and 33 the distance between the contacts 31 and the pertaining contacts of the conveying pivot lever 29 can be adjusted precisely by merely correspondingly adjusting the intermediate abutments 34 as to their thickness.

It may be assumed that the transverse beam 1 is precisely arranged perpendicularly with regard to the guiding paths 19 and 20 and is braced as to its guiding beds 5 and 6 by means of the clamping device visible in FIG. 6. Consequently, the contact arm 26 of FIG. 3 and the lever 29 of FIG. 4 occupy the illustrated intermediate position. If it is intended to displace the transverse beam 1 along the pit 7 in order, if desired, to mill successively a plurality of surfaces precisely parallel to each other on a workpiece connected to the mounting plate 2, the clamping engagement according to FIG. 6 is hydraulically disengaged. To this end, a pressure medium is caused to displace the piston 39 against the pressure of the spring 40 in the cylinder housing 41 whereby the conical bolt 42 connected to the piston 39 through the intervention of a piston rod and thus also the counter conical bolt 43 move out of the clamping jaws 44 and 45 and 46 and 47 respectively which previously had their end faces in view of the pressure of the spring 40 moved into engagement with the guiding paths 19 and 20 of the precision guiding means 17. By means of this or a similar clamping device, the bed carriages 3 and 4 are able by means of their guiding beds to exert a clamping action in the longitudinal as well as in the transverse direction when the transverse beam 1 is at a standstill.

When the drive for a longitudinal displacement of the transverse beam 1 is put into action, the bed carriage 3 guided laterally by means of the roller guiding element pair 21 and also the laterally nonguided bed carriage 4 are displaced on their guiding beds 5 and 6 by means of the rack drives 15 and 16. The drive is effected through the intervention of the transmission shown in FIG. 5.

The frictional rotational connection between the common drive gear 48 and the two bed carriages 3 and 4 is effected for the bed carriage 3 through the intervention of the gear pair 49, 50 with inclined teeth. The narrower gear 50 is by means of a control motor 51 controlled by the control value emitter displaceable through spindle 52 and the fork 53 on the wider gear 49. The drive of the bed carriage 4 is effected by means of the gear pair 54 and 55 with straight teeth. The revolutions of the output shaft of the two gear pairs 49, 50 and 54, 55 are each conveyed through a bevel gear drive 56, a worm gear drive 57 and a transmission 58 to two rack pinions 59 and 60. The pinion 60 is arranged on an eccentric bushing for play free adjusting the two pinions relative to each other. If during the longitudinal displacement of the transverse beam one of the two bed carriages 3 or 4 of the transverse beam 1 should move faster than the other so that the transverse beam 1 is turned out of its position in which it is precisely perpendicular to the guiding paths of the precision guiding means 17, in other words if the transverse beam 1 pivots about the axis 22 of the roller guiding element pair 21 inasmuch as a lateral guiding for the transverse beam 1 does not exist, the pivot movement will be noticeable on an enlarged scale on the control value emitter in conformity with its distance from the pivot axis 22.

According to the embodiment of FIG. 3, the measuring gauge 27 will, in conformity with the pivoted position of the transverse beam relative to its normal position indicate a larger or smaller deviation which when a switch point is exceeded turns on the control motor 51 on the adjusting transmission. As a result thereof, the gear 50 with inclined teeth will by means of the fork 53 displaced by spindle 52 be displaced on the gear 59 to a certain extent whereby the speed of the rack pinion during the displacement of the gears 49, 50 relative to each other will be increased or decreased depending on the direction in which the pointer of the measuring gauge 27 moves. When the normal position of the bed carriage 3 and thereby the proper position of the transverse beam precisely parallel to its guiding path has been reestablished, the control motor 51 will again and automatically be turned off when the switch point of the measuring gauge 27 has been passed by.

For the purpose of clarification it may be added that the feeler pin $p$ forms a part of the measuring gauge 27 and thus a part of its feeler which is continuously in engagement with the abutment 28. When a pressure is exerted against the abutment 28, the pointer of the measuring gauge 27 pivots in one direction. When the arm 26 pivots in the opposite direction, the pointer of the measuring gauge 27 moves in the opposite direction while the end of the feeler tip $p$ is kept in engagement with the abutment 28 by spring force. The movements of the pointer of the measuring gauge are used for correcting the position of the transverse beam. The employed control elements are standard elements known in the art. Principally, the control element in the form of the measuring gauge 27 operates in the same manner as the control element of FIG. 4 to be described further below. The arrangement of FIG. 4 is in so far somewhat more favorable as it comprises a lever transmission so that smaller movements of the pointer can be registered and bring about the correction of the position of the transverse beam.

The control described above in connection with FIG. 3 is according to FIG. 4 similarly obtained by means of the measuring gauge arranged therein, however, with the difference that in view of the double arm transmission lever 29 an enlargement of the actual pivot angle of the transverse beam is effected in conformity with the arm length between the pivot point 30 and the linkage point with the contact arm 26 of the measuring gauge 18 on one hand and the pivot point 30 and the contacts 31 on the other hand. If the transmission ratio is, for instance, 1:10, the free end of the transmission lever 29 pivots by a multiple of ten relative to the pivot path or stroke of the coupling area between the contact arm 26 and the transmission lever 29. Inasmuch as due to the very finely adjustable intermediate abutments 24 a precise adjustment of the distances between the contact 31 relative to the counter contacts is possible, it will be appreciated that by means of the device of FIG. 4 a very sensitive control of the displacement of the transverse beam 1 is made possible. Accordingly, in view of even a slight displacement of the transverse beam 1 from its normal position perpendicular to the guiding paths, the transmission lever 29 will engage one of the contacts 31 whereby the control motor 51 is caused to rotate in one or the other direction until the pivot lever does no longer engage the contact as a result of which the control motor 51 is again stopped.

By means of this control device a milling of precisely parallelly arranged surfaces on a workpiece will be assured or the cutting of a plurality of bores will be assured which are either arranged precisely one behind the other or offset at an angle with regard to each other. Neither noncontrollable frictional conditions between the individual machine parts nor pitch or spacing errors in the driving elements of the adjusting transmissions can bring about any material running ahead or lagging behind of one of the two ends of the transverse beam 1. If the transverse beam should pivot even only slightly out of its normal position, a temporary short change in the advancing speed of the bed carriage 3 will be effected whereby the transverse beam 1 will be returned to its normal position. When reaching the precise angle position of the transverse beam with regard to its guiding path, the two bed carriages 3 and 4 are again operated at the same feed velocity whereby the control operation is completed.

It is, of course, to be understood that the present invention is, by no means, limited to the particular arrangements shown in the drawings but also comprises any modifications within the scope of the appended claims.

We claim:

1. In a portal type milling machine having a beam adapted for displacement in parallelism with itself relative to a working region: a support carriage rigidly mounted on each end of the beam, a guide rail supportingly engaging each support carriage, said guide rails being parallel and extending at a predetermined angle relative to said beam, drive means including interengaging elements on each support carriage and the respective rails for driving the support carriages and beam along said rails, the interengaging elements on the support carriages being rotatable, a common drive member for said rotatable elements and respective drive trains leading from said drive member to each of said rotatable elements, surface means on one of said rails in a plane parallel to the direction of movement of said beam and angular to the plane of said rails, the support carriage on said one rail engaging said surface means so as to be nonlaterally movable on said one rail while being tiltable thereon in the plane of said rails if said support carriages fail to move in synchronism, a measure carriage on said one rail movable longitudinally of said one rail with the respective support carriage and engaging said surface means so as to be nontiltable on said one rail in the plane of the rails, cooperating elements of detecting means on said measuring carriage and the adjacent support carriage responsive to tilting of the support carriage on said one rail to develop signals, and control means under the control of said signals and operable for adjusting the relative positions of said support carriages on the respective rails so as to eliminate the tilting on said one rail of the support carriage thereon.

2. A machine according to claim 1, which includes means for clamping the support carriages to their respective rails when the machine is stationary on said rails.

3. A machine according to claim 1, in which said control means is operable for adjusting one of said drive trains to change the relationship between said drive member and the respective one of said rotatable elements.

4. A machine according to claim 3, in which said one drive train includes a pair of meshing skew gears, and said control means includes means to adjust the axial position of one of said gears relative to the other thereof.

5. A machine according to claim 4, in which said control means includes a screw, a reversible motor drivingly connected to said screw and sensitive to said signals to rotate in one direction or the other, a nut on the screw, and a yoke connected to the nut and engaging said one gear for shifting said one gear in the axial direction when said screw is rotated by said motor.

6. A machine according to claim 1, in which one of said measuring carriage and the adjacent support carriage includes an arm extending therefrom in the plane of said rails and supporting the respective one of said elements of said detecting means.

7. A machine according to claim 6, in which said elements of said detecting means comprise electrical contacts engageable and disengageable in response to tilting of the said support carriage on said one rail relative to the measuring carriage.

8. A machine according to claim 1, in which said elements of said detecting means comprise electrical contacts, a lever pivoted on one of said measuring carriage and the adjacent support carriage and having a longer arm and a shorter arm, the shorter arm of said lever being engaged by the other of said carriages, and said contacts being actuated by the end of the longer arm of said lever.